J. CARTIER AND C. DELCOURT.

LOOM CHECK.

APPLICATION FILED SEPT. 29, 1919.

Reissued Apr. 12, 1921. 15,081.

Inventors
Joseph Cartier,
and Charles Delcourt,
By F. Hume Talbert
Attorney

UNITED STATES PATENT OFFICE.

JOSEPH CARTIER AND CHARLES DELCOURT, OF FALL RIVER, MASSACHUSETTS; SAID DELCOURT ASSIGNOR, BY MESNE ASSIGNMENTS, OF ALL HIS RIGHT TO JOSEPH E. ROCHETTE, OF NORWICH, CONNECTICUT.

LOOM-CHECK.

15,081. Specification of Reissued Letters Patent. Reissued Apr. 12, 1921.

Original No. 1,364,710, dated January 4, 1921, Serial No. 327,204, filed September 29, 1919. Application for reissue filed February 28, 1921. Serial No. 450,031.

*To all whom it may concern:*

Be it known that CHARLES DELCOURT and JOSEPH CARTIER, citizen of the United States of America, the said CHARLES DELCOURT being a subject of Great Britain, residing at Fall River, in the county of Bristol and State of Massachusetts, have invented new and useful Improvements in Loom-Checks, of which the following is a specification.

The object of the invention is to provide a simple and efficient attachment for a loom as for example of the Northrop type to cushion or absorb the jar or shock between the picker stick and the lay incident to the operation and relative movements of these parts, to avoid breakage or other injury and to increase the durability of the members while minimizing loss of time incident to necessary repairs and amounting under ordinary circumstances to a considerable item in the operation of mechanisms of this kind.

A further object of the invention is to provide a device for this purpose which can be applied to the above indicated or any other of the ordinary forms or types of looms without any modification in the construction or arrangement thereof and without necessitating the employment of any special skill in the adaptation thereof, to the end that the ordinary loom attendant may apply the same to machines already in use.

With these and related objects in view the invention consists in a construction and combination of parts of which a preferred embodiment is shown in the drawing, it being understood that changes in form, proportions and details may be resorted to within the scope of the appended claims without departing from the principles involved.

Figure 1:
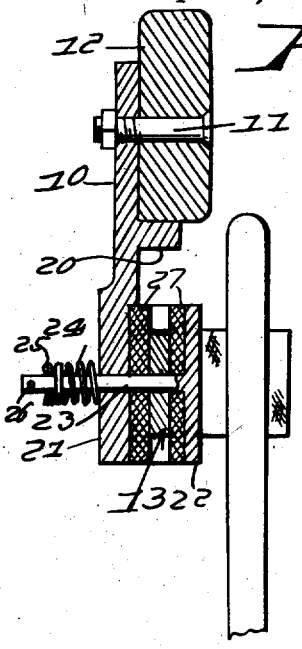
Figure 1 is a sectional view of the device as seen applied to a loom lay with the picker stick arranged in operative relation therewith.
Figure 2:
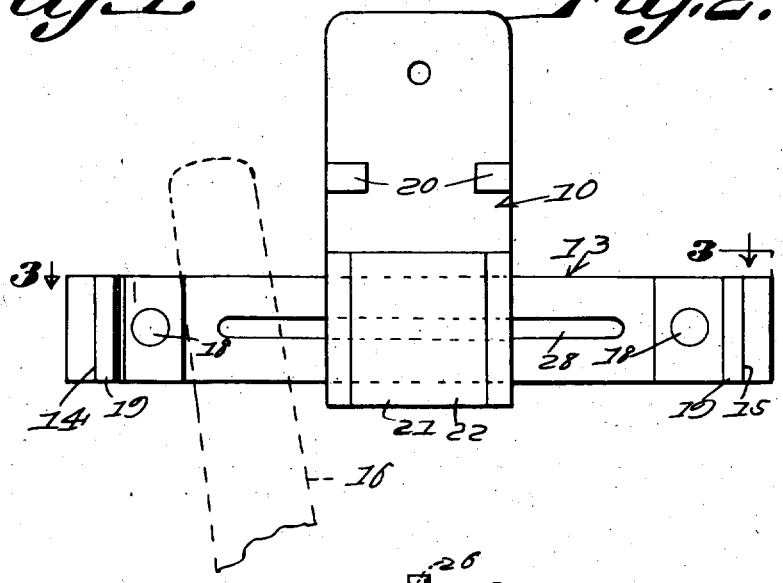
Fig. 2 is a front view of the same showing the picker stick in dotted lines.
Figure 3:
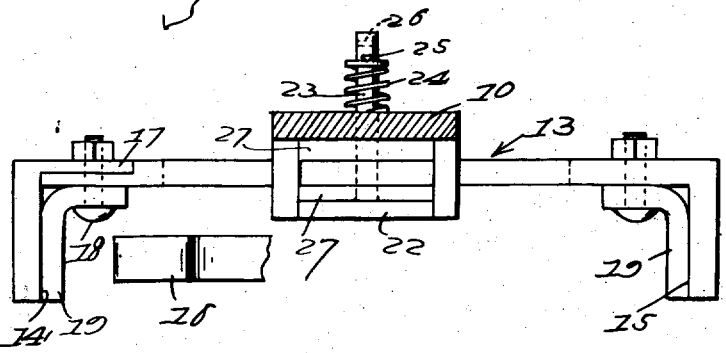
Fig. 3 is a horizontal sectional view on the plane indicated by the line 3—3 of Fig. 2.

The check consists essentially of a bracket member 10 adapted to be secured by means of a bolt 11 or the equivalent thereof to a loom lay 12, and a slide member 13 mounted for endwise, frictionally resisted, movement upon the bracket member and having spaced abutments or shoulders 14 and 15 for alternate contact by the picker stick indicated at 16.

Figure 4:
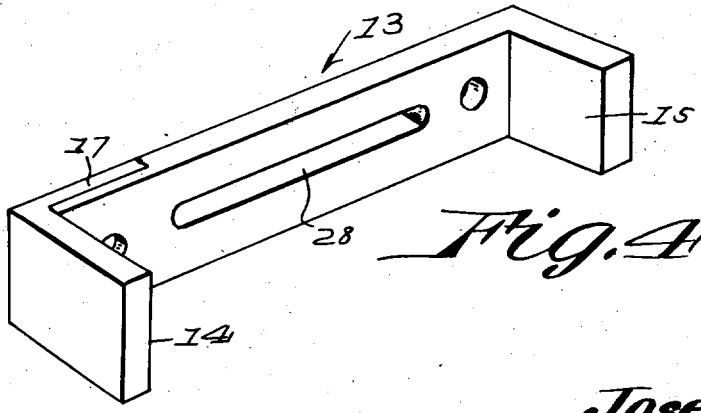
Fig. 4 is a detail view in perspective of the slide member.

In the construction illustrated the slide consists of a flat bar, shown clearly in Fig. 4, upturned at its extremities to form ears of which the inner surfaces constitute the shoulders 14 and 15, and preferably one of these ears is detachably connected with the body portion of the slide as by a lap joint 17 engaged by a bolt 18, to permit of the insertion of the slide into the box. Removably secured to the side adjacent to each shoulder and adapted to over-lie the shoulder so as to be in the path of the picker stick in its movements therebetween, are the leather or similar cushions 19.

The bracket member is adapted to lie in contact with the side surface of the lay and is provided with a ledge consisting of lugs 20 to engage the lower edge of the lay, and the downwardly projecting portion of the bracket constitutes a guide upon which the slide is mounted, said guide being a fixed element 21 and the movable element 22 connected by a stem 23 extending from the removable member through the fixed member and engaged by a tension spring 24 held at the desired adjustment by means of a cotter pin 25, or its equivalent and which is engageable with different openings 26 in the stem to vary the tension of the spring. Between the surfaces of the slide and the surfaces of the elements of the guide are interposed leather frictional elements 27 which also take the wear and are adapted to be replaced when necessary to insure the proper relative movement of the parts of the check.

It will be understood that the frictional contact of the elements 27 with the surfaces of the slide serves to resist the movement of the slide therebetween while permitting a sufficient movement to cushion the jar or shock, and that this resistance may be modified by means of the adjustment of the tension spring. The stem 23 of the movable guide or clamp member extends through a slot 28 in the slide so that a sufficient freedom of movement of the latter is permitted.

It will be understood moreover that the only preparation of the loom necessary to adapt it to receive a check constructed as described is the formation of a hole in the lay to receive the securing bolt 11.

What is claimed is:

1. A loom check comprising a bracket for attachment to the lay of a loom and having complemental clamping members of which one is integral with the bracket, a slide carried between the clamping members and provided with upturned extremities to form ears of which the inner surfaces constitute abutment shoulders for disposition on opposite sides of the picker stick of a loom, frictional elements interposed between the clamping members and the slide, and means for adjusting the degree of frictional contact between said members and the slide.

2. A loom check comprising a bracket having complemental clamping members of which one is integral with the bracket, a slide carried between the clamping members and designed for end-wise movement, the said slide being formed with upturned ears of which the inner surfaces constitute abutments for disposition on opposite sides of the picker stick of a loom, frictional elements interposed between the two clamping elements and the slide to frictionally resist movement of the same, and cushioning members carried by the slide and disposed against the abutments to lie in the path of the picker stick in its movement between the shoulders.

3. A loom check comprising a bracket provided with complemental clamping members of which one is formed as a part of the bracket, a slide carried between the clamping elements and formed with upturned ears for disposition on opposite sides of the picker stick of a loom, the inner surfaces of the two ears constituting abutment shoulders for the picker stick and one of said ears being removably secured to the body portion of the slide by a bolt engaging a lap joint, and means to frictionally resist the movement of the slide between the clamping members.

In testimony whereof we affix our signatures.

JOSEPH CARTIER.

CHARLES $\overset{\text{his}}{\underset{\text{mark}}{\times}}$ DELCOURT.

Witness:
N. HATHEWAY.